US012574749B2

(12) United States Patent
Mody et al.

(10) Patent No.: US 12,574,749 B2
(45) Date of Patent: Mar. 10, 2026

(54) APPLICATION-BASED INCUMBENT INFORMING CAPABILITY FOR SPECTRUM SHARING

(71) Applicant: A10 Systems LLC, Chelmsford, MA (US)

(72) Inventors: Apurva N. Mody, Chelmsford, MA (US); David Simpson, Springfield, VA (US)

(73) Assignee: A10 SYSTEMS INC, Lowell, MA (US)

( * ) Notice: Subject to any disclaimer, the term of this patent is extended or adjusted under 35 U.S.C. 154(b) by 390 days.

(21) Appl. No.: 18/063,539

(22) Filed: Dec. 8, 2022

(65) Prior Publication Data

US 2023/0180016 A1      Jun. 8, 2023

Related U.S. Application Data

(60) Provisional application No. 63/291,831, filed on Dec. 20, 2021, provisional application No. 63/287,507, filed on Dec. 8, 2021.

(51) Int. Cl.
*H04W 16/14* (2009.01)
*H04W 72/0453* (2023.01)

(52) U.S. Cl.
CPC ....... *H04W 16/14* (2013.01); *H04W 72/0453* (2013.01)

(58) Field of Classification Search
CPC . H04W 16/14; H04W 72/0453; H04W 72/04; H04W 72/542; H04W 16/22; H04W 72/12; H04W 72/54
See application file for complete search history.

(56) References Cited

U.S. PATENT DOCUMENTS

| | | | | |
|---|---|---|---|---|
| 7,027,773 B1* | 4/2006 | McMillin | ................ | H04L 45/00 |
| | | | | 455/445 |
| 2008/0095055 A1* | 4/2008 | Moulsley | .......... | H04W 72/1221 |
| | | | | 370/234 |
| 2017/0265205 A1* | 9/2017 | HomChaudhuri | ... | H04B 7/0413 |
| 2018/0084429 A1 | 3/2018 | Guo et al. | | |
| 2018/0176787 A1* | 6/2018 | Fakoorian | ......... | H04W 72/0453 |
| 2019/0082491 A1* | 3/2019 | Shelby | .................. | H04W 76/28 |

(Continued)

FOREIGN PATENT DOCUMENTS

| | | | | |
|---|---|---|---|---|
| CN | 109982328 A | 7/2019 | | |
| CN | 106779316 B | 12/2020 | | |
| WO | WO-2020068127 A1 * | 4/2020 | .......... | G06K 9/6262 |

OTHER PUBLICATIONS

International Search Report; dated Oct. 11, 2023; Application # PCT/US2022/081198.

*Primary Examiner* — Mewale A Ambaye
(74) *Attorney, Agent, or Firm* — Polsinelli PC

(57) ABSTRACT

Disclosed herein are systems, methods, and computer-readable media directed to a software application that may be downloaded to and executed on any type of end terminal (may also be referred to as a user equipment), through which UEs of heterogenous systems sharing a frequency band can inform each other and coordinate usage and transmission in the shared frequency band in a distributed and near real-time manner to avoid and minimize interference. This software application can provide an application-based approach for wireless spectrum management.

20 Claims, 11 Drawing Sheets

RECEIVE INFORMATION RELATED A SCHEDULE OF USE OF A FREQUENCY BAND BY ONE OR MORE UES OF A SYSTEM DESIGNATED AS A PRIMARY USER OF THE FREQUENCY BAND
800

COORDINATING USE OF THE FREQUENCY BAND (E.G., SHARED FREQUENCY BAND DESCRIBED ABOVE) BY ONE OR MORE PRIMARY UES OF THE SHARED BAND AND ONE OR MORE SECONDARY UES OF THE SHARED BAND
802

PERFORMING FOR DYNAMIC SPECTRUM SHARING USING A TRAINED MACHINE LEARNING MODEL
804

(56)  References Cited

U.S. PATENT DOCUMENTS

| 2019/0394790 | A1* | 12/2019 | Damnjanovic | ... | H04W 72/0446 |
| 2020/0036487 | A1* | 1/2020 | Hammond | ........... | H04L 5/0012 |
| 2020/0068563 | A1* | 2/2020 | Wu | ...................... | H04L 1/1861 |
| 2020/0154454 | A1* | 5/2020 | Gao | ...................... | H04W 72/54 |

* cited by examiner

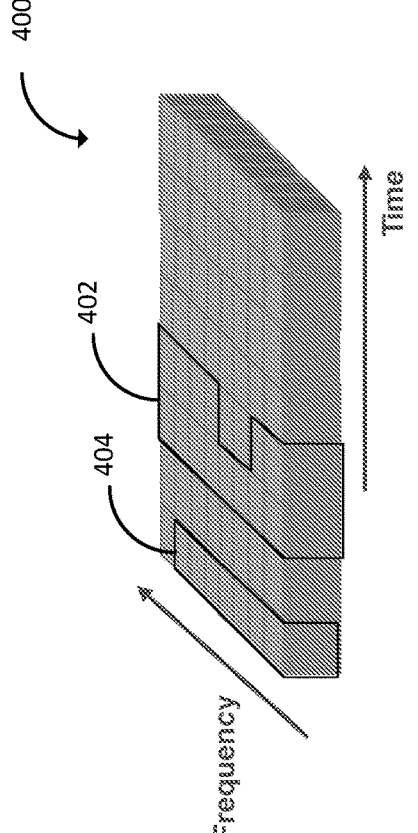
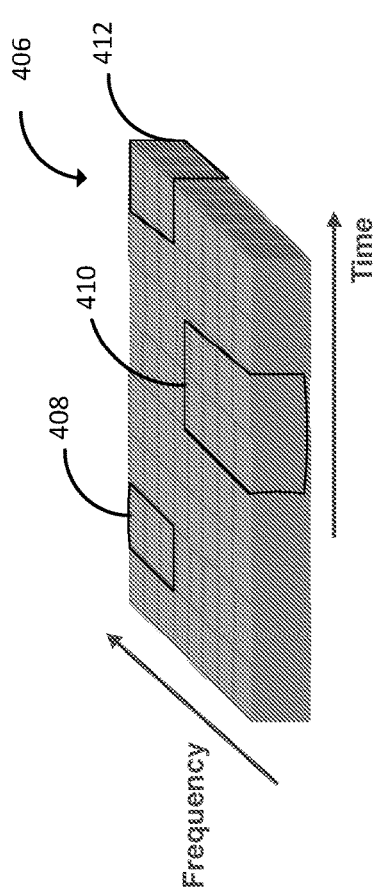
FIG. 4

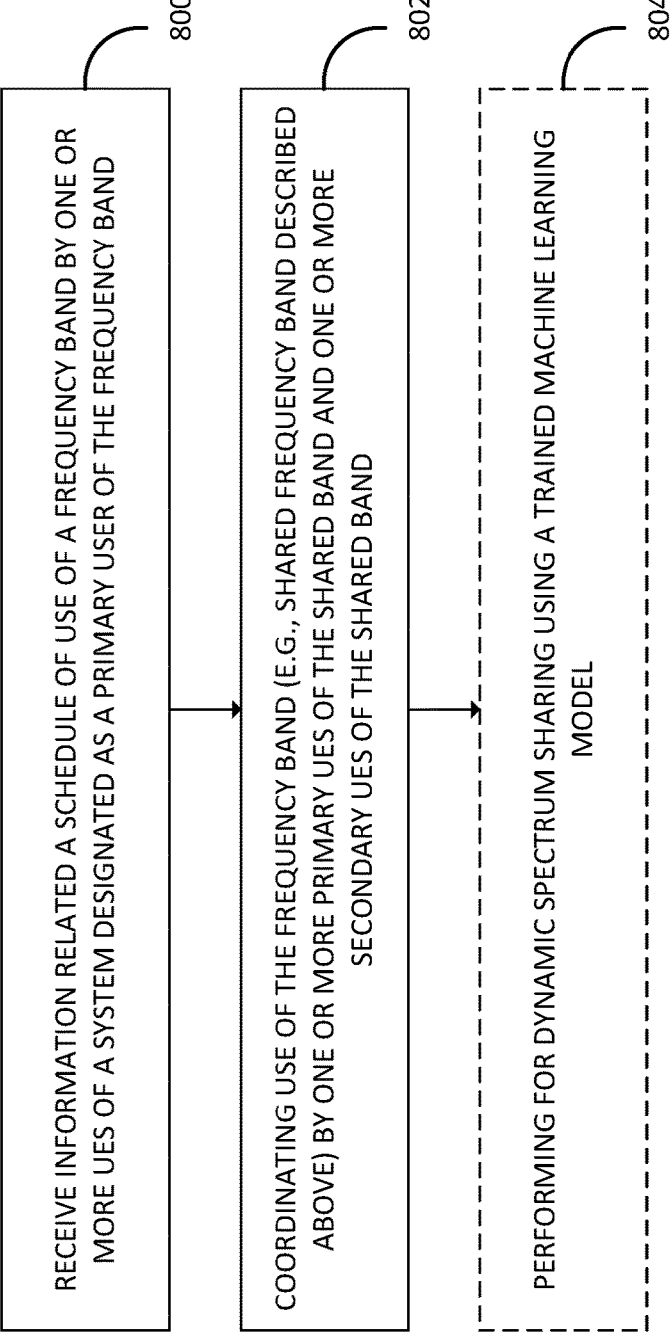

RECEIVE INFORMATION RELATED A SCHEDULE OF USE OF A FREQUENCY BAND BY ONE OR MORE UES OF A SYSTEM DESIGNATED AS A PRIMARY USER OF THE FREQUENCY BAND — 800

COORDINATING USE OF THE FREQUENCY BAND (E.G., SHARED FREQUENCY BAND DESCRIBED ABOVE) BY ONE OR MORE PRIMARY UES OF THE SHARED BAND AND ONE OR MORE SECONDARY UES OF THE SHARED BAND — 802

PERFORMING FOR DYNAMIC SPECTRUM SHARING USING A TRAINED MACHINE LEARNING MODEL — 804

FIG. 8

APPLICATION-BASED INCUMBENT INFORMING CAPABILITY FOR SPECTRUM SHARING

PRIORITY CLAIM

This application claims the benefit of U.S. Provisional Application No. 63/287,507, entitled "SYSTEM AND METHOD FOR APP-BASED INCUMBENT INFORMING CAPABILITY FOR SPECTRUM SHARING," filed on Dec. 8, 2021, and U.S. Provisional Application No. 63/291,831, entitled "SYSTEM AND METHOD FOR APP-BASED INCUMBENT INFORMING CAPABILITY FOR SPECTRUM SHARING," filed Dec. 20, 2021. The content of each application is incorporated herein by reference in their entirety.

TECHNICAL FIELD

The subject matter of this disclosure generally relates to the field of wireless network operations and, more particularly, to a wireless spectrum sharing mechanism that improve the ability of consumers of wireless services to share frequency bands.

BACKGROUND

Wireless broadband represents a critical component of economic growth, job creation, and global competitiveness because consumers are increasingly using wireless broadband services to assist them in their everyday lives. Demand for wireless broadband services and the network capacity associated with those services is surging, resulting in a growing demand for spectrum to support these services. Similarly, the number and type of devices being used by consumers to access content over wireless broadband networks has proliferated. All of these trends are resulting in more demand for network capacity and for capital to invest in the infrastructure, technology, and spectrum to support this capacity. The demand for increased wireless spectrum, moreover, is expected to continue increasing. In response, the Federal Communications Commission continues to work to make available additional licensed and unlicensed spectrum to meet this growing demand. Similarly, large enterprises, such as the Department of Defense (DoD), Federal Aviation Administration (FAA), National Oceanic and Atmospheric Administration (NOAA), National Aeronautics and Space Administration (NASA) and companies and organizations of various sizes, increasingly have a need to be efficient with the spectrum dependent systems they operate either as primary, co-primary or secondary licensees for the radio frequency bands they are assigned. Improved spectrum sharing mechanisms can greatly improve their efficient use of spectrum resources and give multiple stakeholders the confidence required to share frequency bands.

SUMMARY

One or more aspects of the present disclosure are directed to a software application that may be downloaded to and executed on any type of end terminal (may also be referred to as a user equipment), through which UEs of heterogenous systems sharing a frequency band can inform each other and coordinate usage and transmission in the shared frequency band in a distributed and near real-time manner to avoid and minimize interference. This software application can provide an application-based approach for wireless spectrum management.

In one aspect, a spectrum management system includes one or more incumbent user equipment configured to operate in a frequency band and one or more primary user equipment configured to operate in the frequency band. The spectrum management system further includes a software application installed and executed on each of the one or more incumbent user equipment and the one or more primary user equipment. The software application is configured to determine information related to a schedule of use of the frequency band by the one or more incumbent user equipment and coordinate use of the frequency band by the one or more incumbent user equipment and the one or more primary user equipment to ensure transmissions by the one or more incumbent user equipment and the one or more primary user equipment do not interfere.

In another aspect, the software application is configured to determine the information by receiving a number of parameters from a corresponding user of the software application.

In another aspect, the number of parameters include one or more of a location of a corresponding one of the one or more incumbent user equipment, a time of transmission by the corresponding one of the one or more incumbent user equipment, and a frequency at which the transmission occurs.

In another aspect, the software application is configured to coordinate the use of the frequency band by transmitting the information to a network controller of a system with which the one or more primary user equipment are associated, the network controller managing the transmissions by the one or more primary user equipment do not occur at the location, the time and the frequency identified in the information.

In another aspect, the software application on any of the one or more incumbent user equipment is directly connected with the software application on any one of the one or more primary user equipment, the one or more primary user equipment being one or more base stations of a radio access network.

In another aspect, the software application is indirectly connected to the network controller via one or more intermediary components.

In another aspect, the one or more intermediary components include at least one of a federally operated spectrum coordination system or a commercial spectrum access system.

In another aspect, the one or more incumbent user equipment operate in a Radar system and the one or more primary user equipment operate in a radio access network.

In another aspect, the one or more incumbent user equipment operate in a first radio access network and the one or more primary user equipment operate in a second radio access network.

In another aspect, the spectrum management system further includes one or more environmental sensing components configured to monitor and detect operations of the one or more incumbent user equipment, wherein information obtained from monitoring and detecting the operation of the one or more incumbent user equipment may be provided to a spectrum access system, the spectrum access system being configured to use the information provided by the one or more environmental sensing components and the software application to coordinate transmissions by the one or more primary user equipment.

In another aspect, the spectrum management system further includes a network controller communicatively coupled to the software application installed on the one or more incumbent user equipment and the one or more primary user equipment, the network controller being configured to perform automated dynamic spectrum sharing.

In another aspect, the network controller is configured to perform automated dynamic spectrum sharing using a trained machine learning model.

In another aspect, the machine learning model is configured to receive as input, near real-time transmission information for the one or more incumbent user equipment and the one or more primary user equipment, and provide as output, predicted future transmissions on the frequency band, wherein the network controller is configured to perform dynamic assignment of resource blocks in the frequency band to the one or more incumbent user equipment and primary user equipment, based on the predicted future transmissions.

In another aspect, the software application is configured to determine the information in real-time.

In another aspect, the spectrum management system further includes at least one secondary user equipment configured to operate in the frequency band with the one or more incumbent user equipment and the one or more primary user equipment, the at least one secondary user equipment being associated with a system independent of systems with which the one or more incumbent user equipment and the one or more primary user equipment are associated, wherein the software application is installed on the at least one secondary user equipment to enable the coordination among the one or more incumbent user equipment, the one or more primary user equipment, and the at least one secondary user equipment.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 illustrates example spectrum availability maps as a function of time and location according to some aspects of the present disclosure;

FIG. 8 depicts an example process for operating the application-based spectrum management system according to some aspects of the present disclosure;

FIG. 8 is a flow chart of an example process for spectrum management using IIC application according to some aspects of the present disclosure;

DETAILED DESCRIPTION

Figure 1:
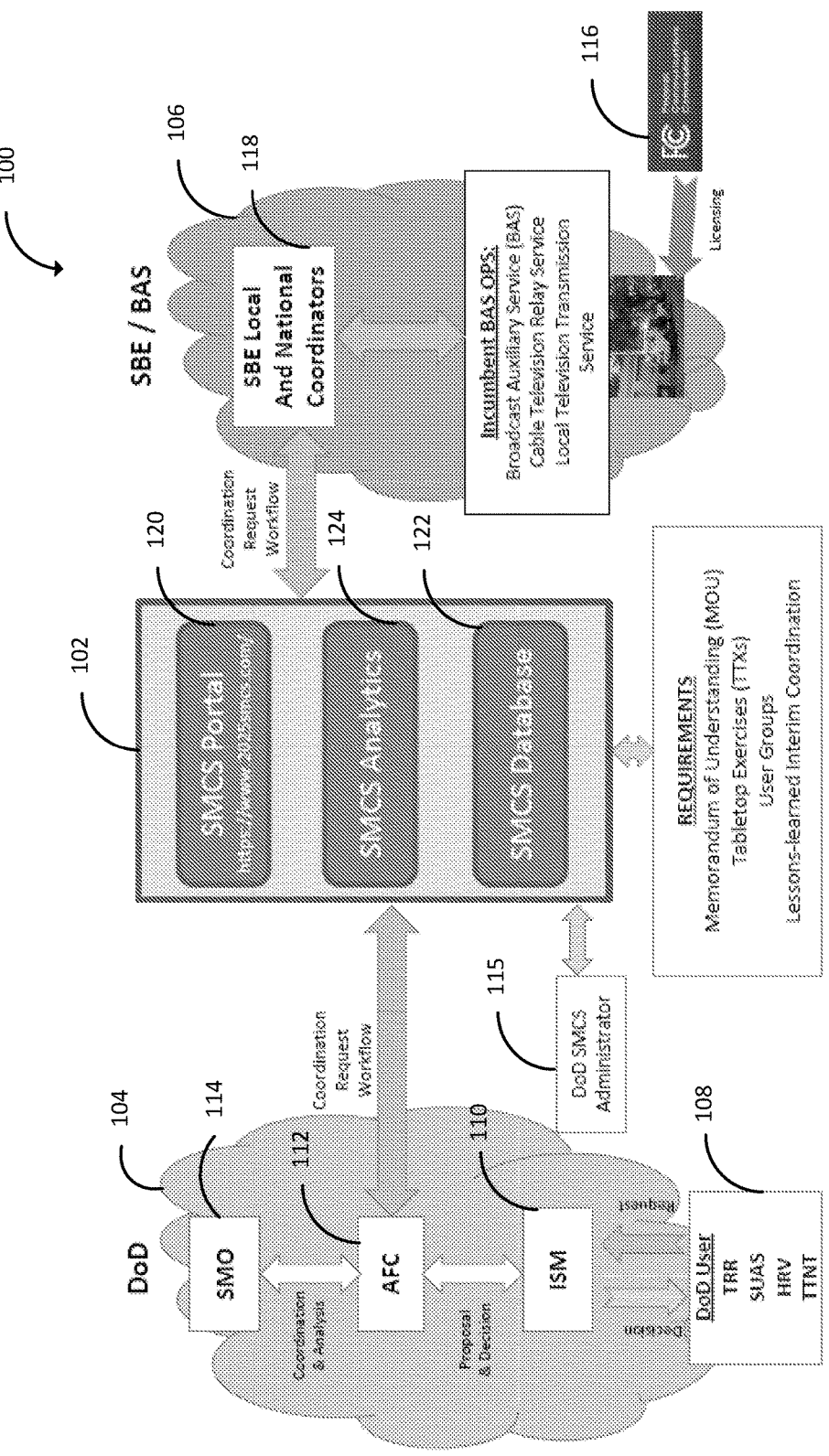
FIG. 1 illustrates a currently utilized spectrum management coordination system.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Management of radio frequencies is typically divided between government use of spectrum (for national security, public safety, critical infrastructure purposes, etc.) and commercial use of spectrum for business related activities (e.g., wireless service providers, broadcasters, etc.). Regulatory authorities implement statutory frequency resource objectives through various mechanisms. In the United States, Federal Departments and Agencies coordinate their use of spectrum bands through the Department of Commerce National Telecommunications and Information Administration (NTIA).

The ever-increasing demand for access to the frequency spectrum and the finite nature thereof has led to a need for dramatically improvements in spectral efficiency in order to unleash the full potential societal value of these finite resources. This presents challenges for governments and companies alike that for decades have counted on exclusive access to fixed blocks of spectrum.

This has led to governance decisions that allowed compatible activities to share given spectrum blocks. For the most part, spectrum deconfliction consisted of relatively static mechanisms to allow secondary spectrum use in a given band as long as that use would not interfere with the primary license. This approach improved the number of supported spectrum dependent systems but reached a practical limit driven by the challenges associated with more granular coordination required to implement 'dense packing' of spectrum dependent systems in a given area.

Objectively, the incorporation of dynamic spectrum sharing as an element of system design will greatly reduce the amount of spectrum that at any given time goes unused. These systems, however, require significant technical coordination throughout the lifecycle of spectrum dependent systems. While there has been a degree of success among homogeneous systems and systems with strong technical and program governance over the lifecycle of user equipment, in most cases interagency, government and commercial spectrum deconfliction continues to rely on static mechanisms to coordinate use.

One or more aspects of the present disclosure address the deficiencies of such static mechanism for managing access to shared spectrum that would greatly improve national spectral efficiency through a near-real time spectrum coordination mechanism that allows incumbent system operators to use their existing spectrum-dependent systems without modification. This near real-time mechanism includes an application downloadable and executable on end terminals and user equipment (UE) such as a smartphone, a tablet, a laptop, a desktop, a wearable electronic device, etc., that facilitates increased spectrum sharing for radios, radars and other equipment between enterprises that have little to no means or reason to coordinate their operations in a shared frequency spectrum. Such an application would facilitate sharing with lower link margins and process overhead than today's more static deconfliction planning methods.

For purposes of describing the inventive concepts of the present disclosure, a non-limiting use case will be described for heterogenous spectrum dependent system. In this non-limiting use-case the application provides an Incumbent Informing Capability (IIC) (hereinafter, may be referred to as IIC application) for frequency operations deconfliction between military radio, radars, Tactical Data Links (TDLs) and commercial point-to-point radios used by the Broadcast industry for Electronic News Gathering (ENG) and other entertainment content requiring live backhaul over Broadcast Auxiliary Spectrum (BAS) to a central facility from which over-the-air broadcast television and radio signals are transmitted. However, the present disclosure is not limited to this non-limiting use case and may be used by any entity (end user) having access to and utilize available frequency band(s) shared by multiple entities/users.

Referring back to the static mechanisms currently in use, Broadcasters coordinate channel use between local stations through a local community of interests using email, spreadsheets and norms developed through local ad-hoc agreements between users. Each local BAS Channel coordinator executes the deconfliction responsibility in a manner that works for local users, but results in significant variation in the 'roll up' of channel use data at the national level. The ENG industry has assigned a National Coordinator to be the primary interface for BAS deconfliction with DoD. The relatively rudimentary systems support, variations in local collaboration and risk averse protection decisions contribute to significant periods of fallow BAS that could be more efficiently used. Near real-time coordination workflow, better confidence between communities of interest through shared situational awareness and semi-automated system controls would reduce spectrum use opportunities lost through the current manual deconfliction mechanism.

In another example of existing static mechanisms, DoD has built a Spectrum Management Coordination System (SMCS) Portal designed to connect the various military organizations planning and conducting operations as co-primary users in the BAS bands dedicated for ENG use. The Federal Communications Commission (FCC) has made clear that while DoD enjoys co-primary status, DoD has the full onus to ensure that DoD system operations do not interfere with ENG incumbent use of the BAS band. The SMCS Portal serves as a repository for registered ENG operators and terminals, geographic limitations on DoD BAS Band operations, spectrum management and organizational contact information for military radio, radar and tactical data link operations. This portal replaced an e-mail coordination workflow whose 'time-late' nature and inherent ambiguities contributed to skepticism in the ENG community leading to resultant risk-averse protection of BAS with lower overall spectral efficiency. The Portal improves upon DoD coordination but will be sub-optimal without a complimentary coordinating mechanism for the ENG Broadcast community of interest (COI).

The near real-time coordination system and the IIC application disclosed herein will provide such a coordinating mechanism that is low cost, has a low barrier to entry, leverages existing wireless infrastructure and would provide affirmative feedback that 'just in time' BAS channel use notification is received, understood and acted upon by potentially interfering emitters. The distributed share situational awareness afforded by the SMCS Portal and the proposed BAS distributed IIC application results in reduced time and area protection declarations by the ENG COI, increasing the available periods of operations for military radio, radar and TDL use.

The proposed IIC application will have extensible utility in other shared bands, as governments continue to make legacy spectrum bands available for 5G and other new wireless systems. In some instances, the TIC application will provide optimal sharing coordination between enterprises. In other instances, the IIC application can serve as a useful stepping stone for automated dynamic spectrum sharing (DSS) that will be designed into future systems. The meta-data collected by the IIC application can support DSS system development and generate useful confidence building between organizations with disparate missions and business objectives.

In the non-limiting use-case described herein and as will be described in more detail below, the IIC application for BAS deconfliction will support ENG operations in the field, at fixed sites, at mobile ground stations and airborne BAS transmissions. The IIC application can pre-register BAS operators and their radios with the DoD operated SMCS portal. It can also collect definitive information on channel use (frequency), antenna selection (omni, directional, fixed, mobile), antenna orientation (azimuth or azimuth range), time, and geo-location, and use the collected data to generate protected BAS volumes in a temporal format that will support 'just-in-time' coordination with DoD. The IIC application can additionally support identification and rapid resolution of harmful interference between authorized BAS transmitters of differing co-primary priority status. The ENG community can rapidly communicate a 'cease buzzer' direction to DoD through SMCS should the de-confliction mechanism encounter an inappropriate transmission. In another use-case for the IIC application, a national defense organization such as DoD, may utilize the IIC application used on military 5G user equipment to enhance SMCS utility and provide out-of-band local validation for SMCS military system operations. The APIs used for the application would support simple integration with future radio, radar and TDL equipment and a wide range of Internet of Military Things (IoMT) wireless protocols.

Throughout the present disclosure references may be made to incumbent users or UEs, primary users or UEs, and secondary users or UEs. An incumbent user/UE may refer to any device of a system operating in a shared frequency band having the highest priority/privilege for transmission in the shared band (e.g., military radar systems and UEs associated therewith). A primary user/UE may refer to any device of a system having paid for a license or right to use the shared frequency band (e.g., UEs and base stations of a 4G/5G radio access network). A secondary user/UE may refer to any device of a system that uses the shared frequency band for transmission opportunistically and without paying for a license to use the shared frequency band.

FIG. 1 illustrates a currently utilized spectrum management coordination system. More specifically, FIG. 1 illustrates architecture 100 for spectrum sharing in the 2025-2110 MHz Band (hereinafter, shared band). However, a shared band may be any licensed and/or unlicensed frequency band in which multiple users/entities may operate. SMCS 102 may be utilized to coordinate between the two systems having access to the shared band (e.g., 2025-2110

MHz). Two non-limiting examples of such systems can include DoD 104 and Society of Broadcasting Engineers (SBE)/BAS 106.

DoD 104 may have a number of users accessing the shared band. Such users may include Tactical Radio Relay (TRR), Small Unmanned Aircraft Systems (SUAS), High Resolution Video (HRV), Tactical Targeting Networking Technology (TTNT), which may collectively be referred to as users 108. Operations of any one of users 108 may be processed through internal DoD mechanism and units. For example, requests for frequency band usage may be submitted by a user 108 to a unit referred to as Industrial Scientific and Medial (ISM) 110, which would then be forwarded to and reviewed by Army Futures Command (AFC) unit 112. Additionally, the spectrum usage may be coordinated with System Management Office 114 at DoD 104. Upon approval, a coordination request workflow may be executed between AFC unit 112 and SMCS 102 to coordinate presence and operation of any one of users 108 in the shared band. DoD 104 may also have a DoD SMCS administrator 115 in charge of operating and administrating SMCS 102.

At the same time, SBE/BAS 106 users may have incumbent operations in the shared band as well, which may have been licensed to them by FCC 116 or any other organization in charge of doing so. Operators 118 (e.g., local and national coordinators) of SBE/BAS 106 systems such as ENGs, may register into SMCS Portal 120 (e.g., using a coordination request workflow) and inform SMCS database 122 of current usage and/or planned usage of the shared band by SBE/BAS 105 users. Since news may happen at any time and at any place, such an approach where operators need to log into the portal and add the information is cumbersome and may not scale.

In one example, SMCS analytics 124 may be utilized to analyze spectrum usage by users 108 and/or users of SBE/BAS 106 as well as provide various types of known or to be developed insights into data collected on spectrum usage by all parties.

Figure 2:
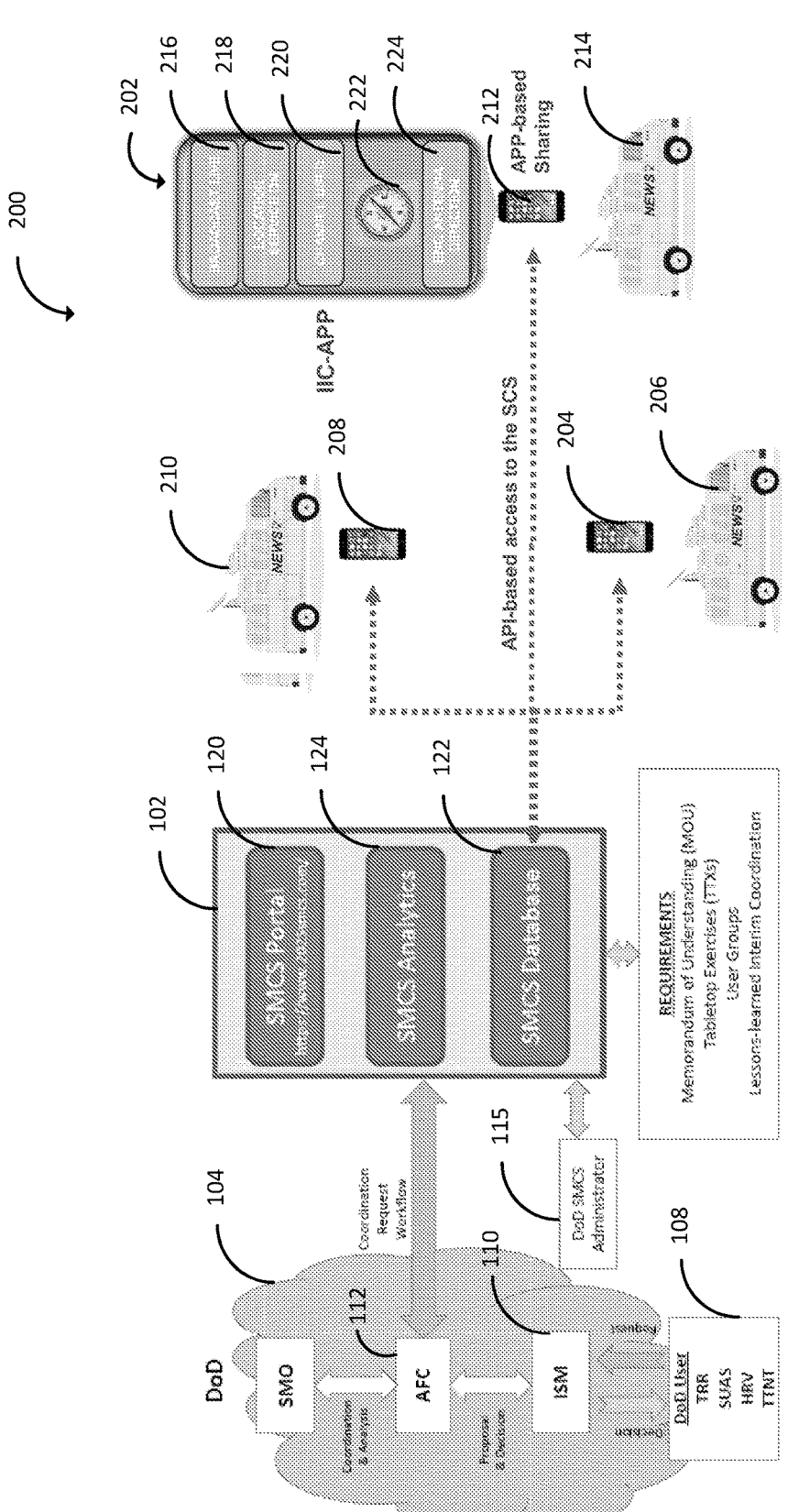
FIG. 2 illustrates an application-based spectrum management system according to some aspects of the present disclosure.

FIG. 2 illustrates an application-based spectrum management system according to some aspects of the present disclosure. A number of components of architecture 200 of FIG. 2 are the same as those described above reference to FIG. 1 and hence will not be further described for sake of brevity. For example, DoD 104, users 108, ISM 110, AFC 112, SMO 114, DoD SMCS administrator 115, SMCS 102, SMCS portal 120, SMCS database 122, and SMCS analytics 124 are the same as that described above with reference to FIG. 1.

On the other hand, architecture 200 of FIG. 2 differs from architecture 100 of FIG. 1 in that a distributed such that IIC application of the present disclosure is used in a distributed fashion by BAS users to provide a near real-time coordination of operation by users 108 and/or BAS users in the shared band.

As shown in FIG. 2, IIC application 202 may be downloaded on a respective user terminal of each BAS user such as UE 204 of BAS user 206, UE 208 of BAS user 210, and UE 212 of BAS user 214. The number of UEs and/or users are not limited to that shown in FIG. 2 and may be more or less.

IIC application 202 may be hosted on a private and/or public cloud infrastructure. Using IIC application 202, any one of users 206, 210, and/or 212 may access SMCS 102. Such access may be an Application Programing Interface (API)-based access using any known and/or to be developed API.

IIC application 202 enables orchestration of the IIC from the Broadcasters (e.g., users 206, 210, and/or 214) which are one type of users of the shared band to operators and users of another type of users of the shared band (e.g., DoD 104). Such an approach provides a faster Machine-to-Machine spectrum sharing by leveraging well developed and secure Application Programming Interface (API) calls. In contrast to a user interface, which connects a computer to a person, an API can connect computers or pieces of software to each other. The calls that make up the API are also known as subroutines, methods, requests, or endpoints. An API specification defines these calls. An API may be custom-built for a particular pair of systems, or it may be a shared standard allowing interoperability among many systems.

In one example, a user (e.g., user 206) wanting to use the shared band may open IIC application 202 on the corresponding UE 204. In using IIC application 202, user 206 may enter a number of different information which may then be conveyed to SMCS portal 120 via API calls, as shown in FIG. 2. The information entered can include, but are not limited to, whether the Broadcast is LIVE (shown as element 216 in FIG. 2), the geographical location of the operator, which may be captured from the location service of UE 204 itself (shown as element 218 in FIG. 2), the frequency channel that is being used by the user 206 (shown as element 220 in FIG. 2), a compass 222 which may be used to provide the direction of an ENG antenna (shown as element 224 in FIG. 2), and transmit power if known to the operator (not shown), etc.

The application-based spectrum management system described above can support spectrum use coordination between any number of enterprise(s) and/or individual(s) wanting to rapidly confirm consideration and mitigation of harmful interference from systems using a shared band. While a BAS-DoD example described above with reference to FIG. 2, shows Radio-to-Radio spectrum sharing, the same application-based spectrum management system can be used to deconflict RADAR-to-Radio spectrum sharing, Radio-to-Electronic Warfare (EW) sharing or any other sharing needs between spectrum dependent systems sharing one or more radio frequency bands. While DoD uses SMCS to extend the primary user's 'intent to use' notification to secondary users in the same band, any portal-based or other Enterprise IT communication mechanism can also be used to inform the parties wanting to deconflict their use.

A RADAR-to-Radio example, might work as follows. Both the RADAR Operator and the Radio Access Network Intelligent Controller (RIC) would be connected through the Spectrum Sharing Gateway API. A RIC assigned as a secondary licensee could be operating continuously in a region for which a primary user would need to assert periodic privilege for exclusive use consistent with the functional requirements of the RADAR. The RADAR owner/operator would use the smartphone, laptop or PC based application to communicate to the RIC the geographic polygon, time and duty cycle requirements that it wants to assert primary use privilege for. This sharing could be relatively coarse and time-based only. It could also be much more granular with a sharing profile unique to the RADAR registered in the APP Spectrum Sharing Gateway. For example, a rotating RADAR may have a fixed rotation rate of 10 seconds requiring exclusive use for 1 second on any given radial. This pre-configured profile would be invoked at the gateway and synchronized via a heartbeat between primary and secondary application or between the RADAR application and the RIC. The RIC would then have the information needed to generate Orthogonal Frequency Division Multiple Access (OFDM) Resource Block Blanking in a manner that is fully synchronized with the RADAR Incumbent's spectrum needs. OFDM is used in Wi-Fi, 4G/5G and various other commercial waveforms.

In this RADAR-to-Radio sharing scenario, trust between primary and secondary users is further enhanced by a 'cease=buzzer' override request feature. Should the primary user ever perceive that secondary user signaling has become harmful interference, the app supports rapid, semi-automatic communication of an order for the secondary user to cease operations in the shared band. This could also included pre-agreed issue escalation contacts between the organizations, to more rapidly deconflict sharing problems and restore maximum band efficiency.

Figure 3:
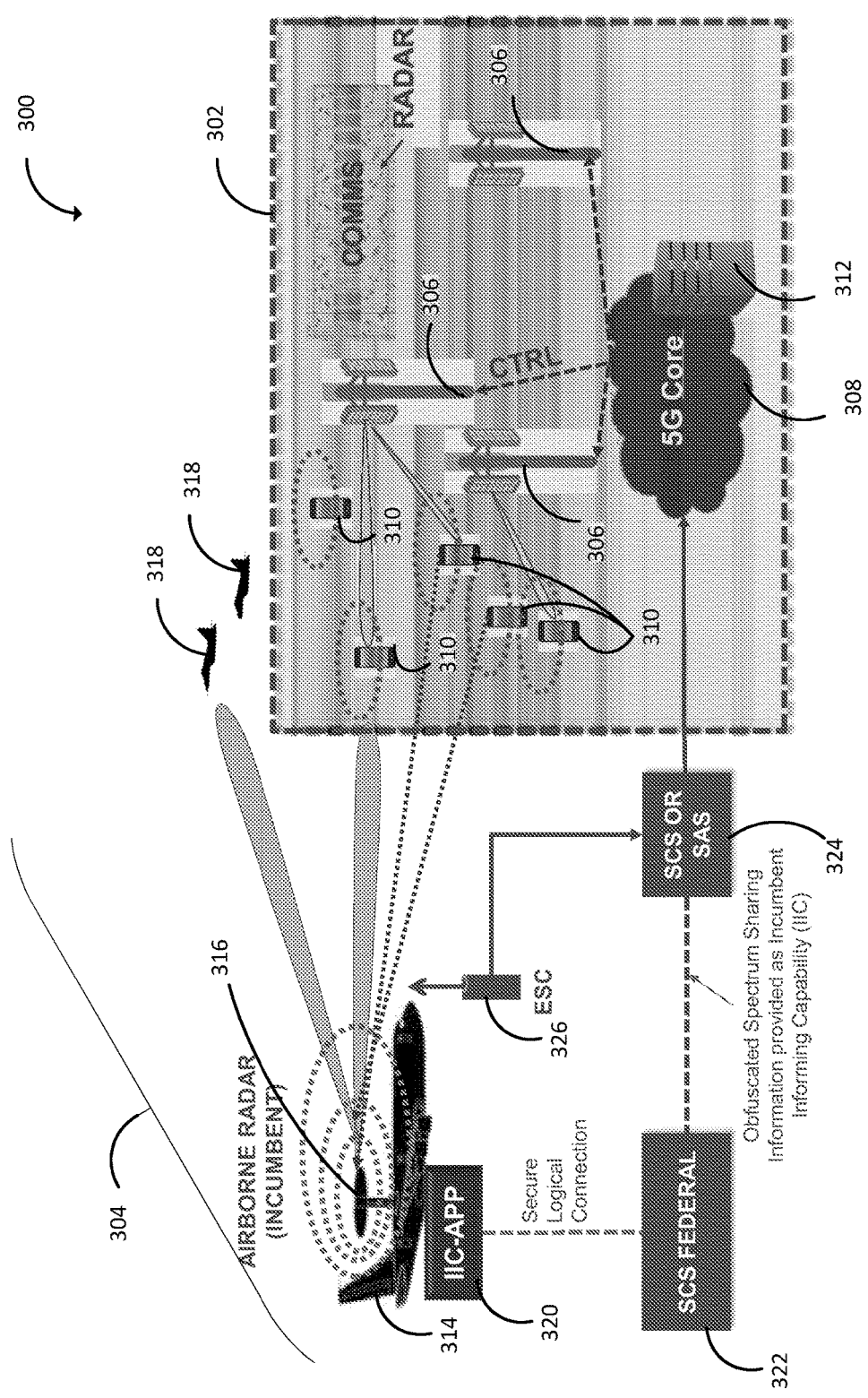
FIG. 3 illustrates an example use of the application-based spectrum management system of FIG. 2 according to some aspects of the present disclosure.

FIG. 3 illustrates an example use of the application-based spectrum management system of FIG. 2 according to some aspects of the present disclosure. More specifically, architecture 300 of FIG. 3 illustrates the use of IIC application described with reference to FIG. 2 in the context of a RADAR-Radio spectrum sharing. As shown in FIG. 3, two example systems include communications system 302 (may also be referred to as a radio access network 302) and airborne radar system 304. Communications system 302 may be a 5G wireless communication system with eNodeBs 306, 5G core 308 (that may include any number of functions and components for operation of a 5G network as known and/or to be developed), a plurality of UEs 310 connected to 5G core 308 via eNodeBs 306. The communication system 302 may further include a network optimizer 312 that can be configured to optimize various aspects of operations and signaling within communications system 302. While a 5G network is mentioned as an example of communication system 302, the present disclosure is not limited thereto and communication system 302 can be any other known or to be developed communication system such as a 4G/LTE system.

Example airborne radar system 304 may include a central component such as aircraft 314 with rotating radar 316 and any number of aircrafts communicating using services of rotating radar 316 such as aircrafts 318. In one example, radar system 304 may be the primary user/licensee of a shared band while wireless communication system 302 may be the secondary user/licensee of the same shared band.

Airborne radar system 304 may be any type of airborne radar system, for example, Airborne Warning and Control System (AWACS). Airborne radar system 304 can transmit and receive RF signals (shown by the dotted lines in FIG. 3). Airborne radar system 304 may transmit and receive RF signals corresponding to a particular frequency band or range, for example, FR1. FR1 may be a shared band/range also used by wireless communication system 302.

AWACS radar systems can be extremely sensitive, being designed to detect aircraft, ships, and vehicles at long ranges (e.g., 200 km and more), and to distinguish between friendly and hostile targets. AWACS radar systems have sensitive receivers with high gain. The high gain helps the AWACS radar system to detect weak backscatter from targets. Energy directed into the AWACS radar may interfere with the receiver. For example, energy from 5G eNodeBs 306 and UEs 310 may desensitize the AWACS radar system and interfere with detection, or backscatter from targets may be lost in the noise generated by the transmissions from 5G eNodeBs 306 and UEs 310. In some examples, spectrum sharing between 5G system 302 and the AWACS radar system 304 may reduce interference with detection and may reduce noise. In this particular example, incumbent user of spectrum may be radar system 304 while 5G communication system 302 may be the Primary or the Secondary user of the spectrum.

As noted above, an operator of aircraft 314 who may also operate and manage airborne radar system 316, can install and access IIC application 320 (which may be the same as IIC application 202 of FIG. 2) on a UE. In another example IIC application 320 may be embedded in radar system 316 itself.

IIC application 320 may be communicatively coupled (via any known or to be developed secure logical connection) to Sharing and Coexistence System (SCS) 322 (which may also be referred to as a Spectrum Coordination System) that may be federally operated for coordinating spectrum licensing and usage. There may also be another commercial SCS or Spectrum Access System (SAS) 324 that may be communicatively coupled to federal SCS 322, 5G core 308, and Environmental Sensing Control (ESC) mechanism 326. As noted above, RADAR owner/operator of radar system 316 can access IIC application 320 on a UE and communicate to a RIC (e.g., 5G core 308 and/or SAS 324) the geographic polygon, time, and/or duty cycle requirements that it wants to assert primary use privilege/access for in order for 5G core 308 to ensure no transmission/interference in the shared band at the designated time/duty cycle specified by radar operator using IIC application 320.

ESC 326 may detect signals transmitted by airborne radar system 304 and/or may collect other data. In some examples, ESC 326 may calculate the location of airborne radar system 304, using any appropriate method such as Time Difference of Arrival (TDoA), Angle of Arrival (AoA) or some other interferometric technique. In some examples, ESC 326 may be prohibited from determining the location of airborne radar system 304, for example, due to operational security concerns, and may instead sense the RF spectrum. ESC 326 may then provide the RF spectrum data it collects to SAS 324.

In one example scenario of FIG. 3, 5G communications system 302 may operate within some geographical area and within some spectrum bands as Radar system 304. IIC application 320 that may be collocated with the incumbent, may use APIs to convey the Radar spectrum usage schedule to Federal SCS 322 using some logical communications channel. The communications channel may be a direct wireless connection between IIC application 320 and Federal SCS 322. Alternatively, IIC application 320 may use a satellite connection which provides the usage schedule to Federal SCS 322 via internet or, it may use some other known or to be developed communication medium/mechanism.

SCS 322 may be configured to detect the presence of radar signals, such as those from airborne radar system 304, and can provide RF spectrum data and any information indicative of the presence of a radar to 5G core 308 and/or network optimizer 312. For example, SCS 322 may provide information indicative of a location and/or approximate location of airborne radar system 304 and/or information indicative of the trajectory or approximate trajectory of airborne radar system 304. SCS 112 may also receive other data from ESC 326 or directly collect data. For example, either ESC 326 or SCS 322 may collect data relating to the absence or presence of airborne radar system 304, the location of airborne radar system 304, or information pertaining to which 5G channels are available for use.

Federal SCS 322 may not want to provide the exact coordinates and the frequency of operation to commercial SAS 324 due to security concerns. Hence, it may obfuscate these parameters. As an example, rather than providing when Radar plans to use the spectrum, IIC application 320 and/or Federal SCS 322 may provide SAS 324 information on what is available to 5G communications system 302 to use. Communications system 302 may then operate within the bounds of what is available without knowing the exact truth of the state of Radar system 304. This may be carried out by computing some obfuscated time and frequency schedule which may be available to 5G communications system 302 to operate at a particular location. This information is conveyed to the communications system 302 as a tuple of (Location, Times, Frequencies) that are available.

FIG. 4 illustrates example spectrum availability maps as a function of time and location according to some aspects of the present disclosure. Specifically, example map 400 may be used to indicate groups of resource blocks (e.g., groups 402 and 404) are available to 5G communications system 302 for use. In another example, map 406 may be provided with groups 408, 410, and 412 available to 5G communications system 302 for use.

Commercial SAS 324 which interfaces with Federal SCS 322 may then pull this information periodically and convey the same to network optimizer 312 (which may also be referred to as a controller or a RIC described above that is configured to perform the Wide Area Network Optimization (WAN Optimization)).

In some examples, network optimizer 312 may receive information from SCS 322, SAS 324, and/or 5G core 308. Network optimizer 312 may analyze the data received to determine if a radar system, for example, airborne radar system 304, is present and/or active in a given area. Network optimizer 312 may also analyze the data received from 5G core 308 to determine 5G network's operational parameters and/or state. Network optimizer 312 may analyze the data provided to it to determine adjustments to the operational parameters and/or state of the 5G network which would minimize or eliminate interference by 5G communications system 302 with airborne radar system 304.

Figure 5:
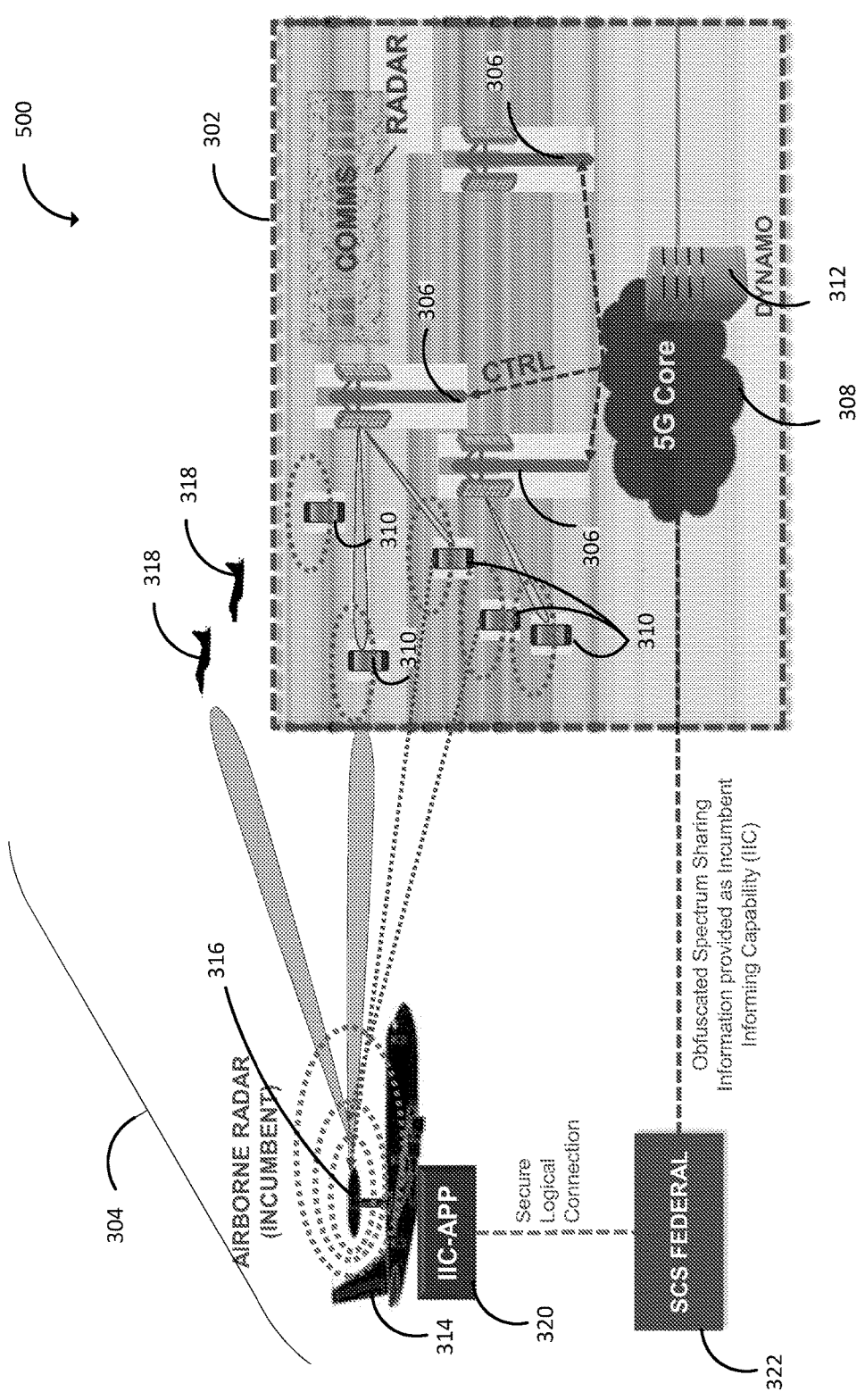
FIG. 5 illustrates an example use of the application-based spectrum management system of FIG. 2 according to some aspects of the present disclosure.

FIG. 5 illustrates an example use of the application-based spectrum management system of FIG. 2 according to some aspects of the present disclosure. Architecture 500 of FIG. 5 and operational thereof is exactly the same as that described above with reference to FIG. 3 except that commercial SAS 324 and/or ESC 326 may not be present as intermediary node(s). In this instance, functionalities of ESC 326 may be performed by radar system 304 itself and/or federal SCS 322. Additionally, Federal SCS 322 may directly interface with and communicate with 5G core 308/network optimizer 312. However, the remaining components of FIG. 5 and functionalities thereof are the same as that described with reference to FIG. 3 and hence will not be further described for sake of brevity.

Figure 6:
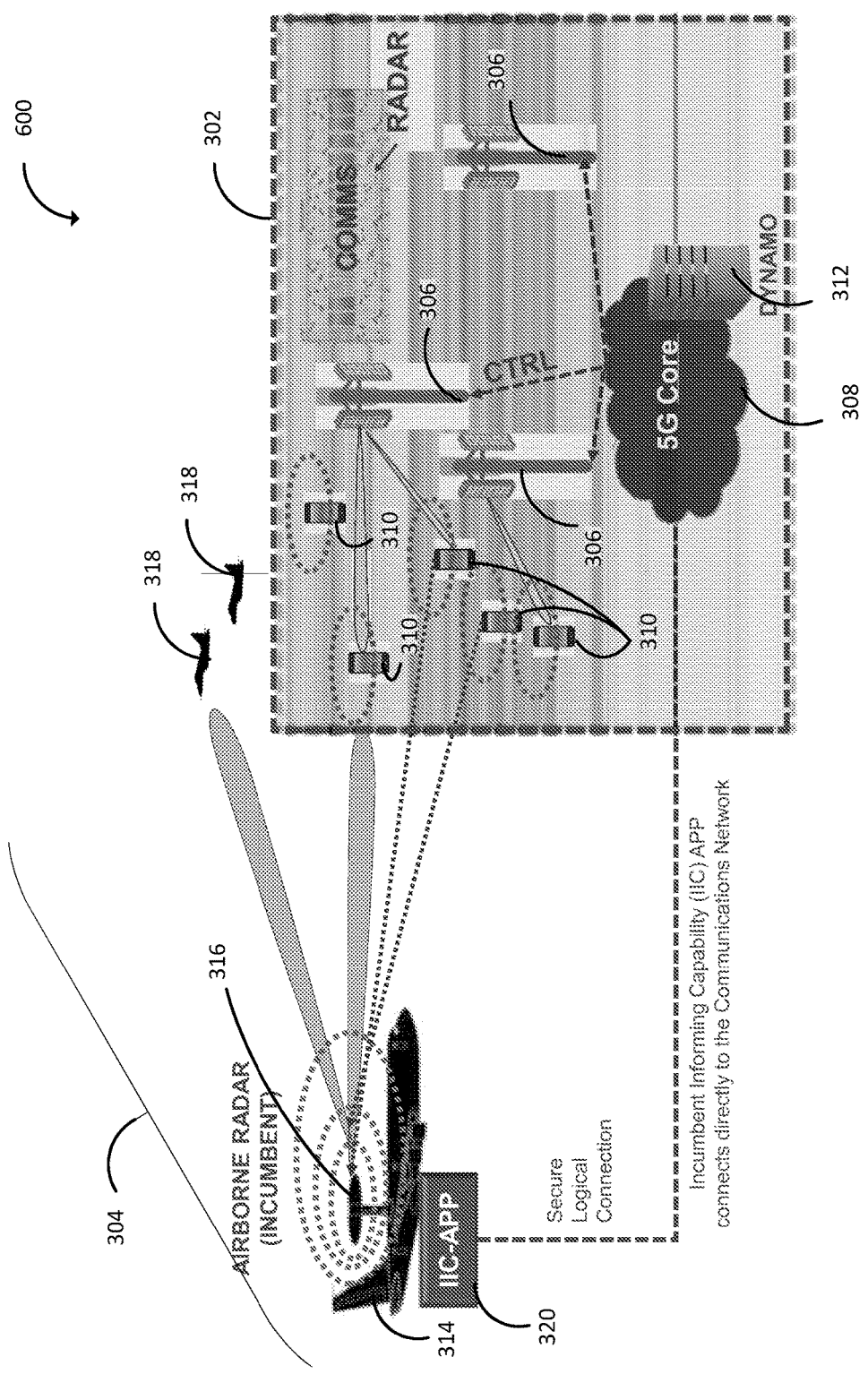
FIG. 6 illustrates an example use of the application-based spectrum management system of FIG. 2 according to some aspects of the present disclosure.

FIG. 6 illustrates an example use of the application-based spectrum management system of FIG. 2 according to some aspects of the present disclosure. Architecture 600 of FIG. 6 and operational thereof is exactly the same as that described above with reference to FIG. 3 except that federal SCS 322, commercial SAS 324 and/or ESC 326 may not be present as intermediary node(s). In this instance, functionalities of ESC 326 may be performed by radar system 304 itself and IIC application 320 may directly interface with and communicate with 5G core 308/network optimizer 312. However, the remaining components of FIG. 6 and functionalities thereof are the same as that described with reference to FIG. 3 and hence will not be further described for sake of brevity.

In one example, the direct communication may be between TIC application 320 of airborne radar system 304 and a corresponding IIC application installed on each of eNodeBs 306 of 5G system 302. In this example, the direct communication will allow the eNodeBs 306 to determine a spectrum sharing schedule based on the availability of the shared band received from IIC application 302 and schedule transmission or the UEs 310 according to the schedule.

Figure 7:
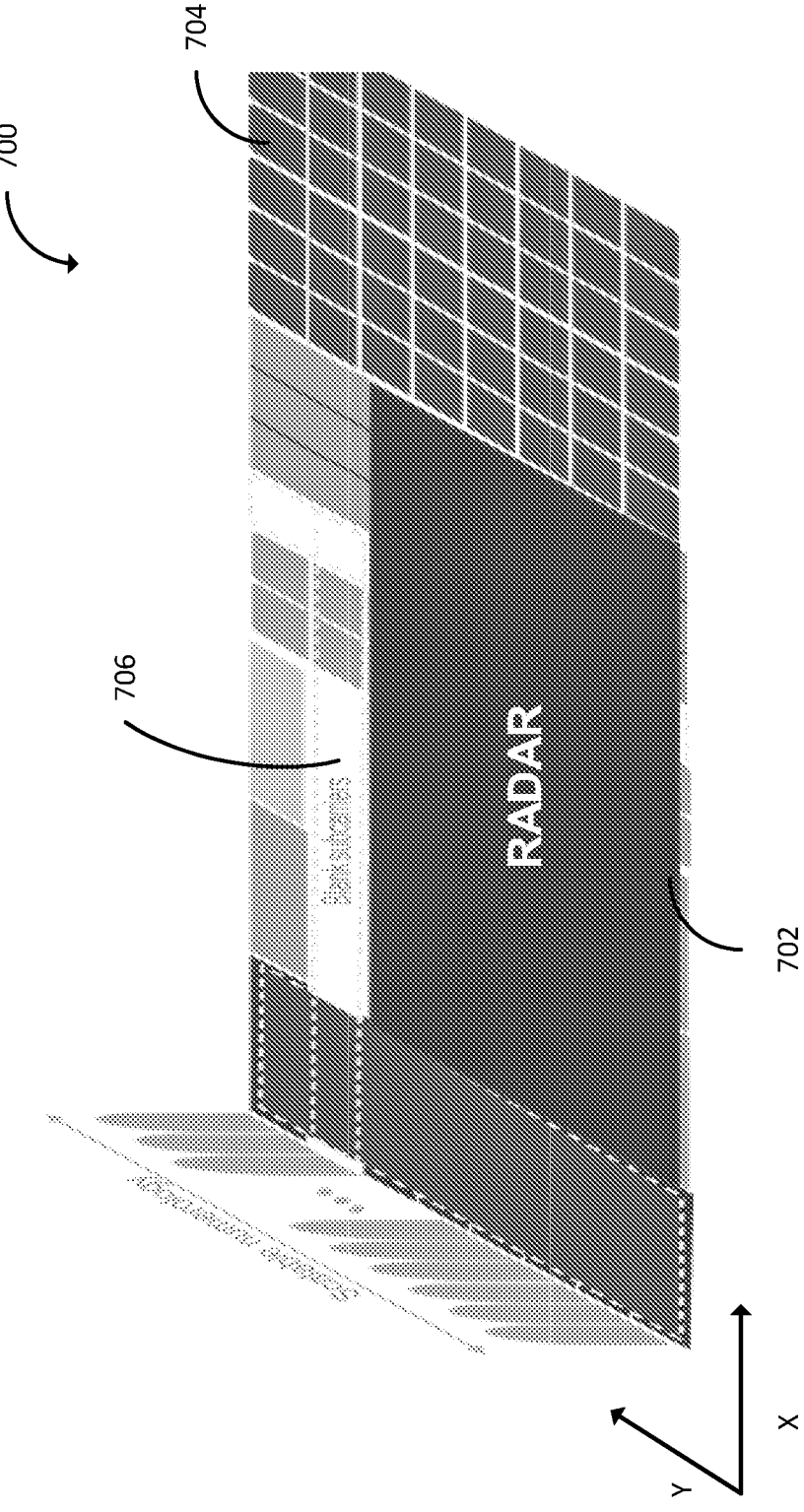
FIG. 7 illustrates an interference control mechanism when operating in a shared spectrum according to some aspects of the present disclosure.

FIG. 7 illustrates an interference control mechanism when operating in a shared spectrum according to some aspects of the present disclosure. Such interference control mechanism may be implemented via resource block sharing between a communications system such as wireless communications system 302 and radar system 304 of FIG. 3. As shown in FIG. 7, in a frame 700 subcarriers 702 may be reserved for radar system 304 to be use while subcarriers 704 may be reserved for use by communications system 302 and subcarrier 706 are not used. Such spectrum sharing may also be carried out at a much coarser granularity where the communications system 302 is provided a list of channels that are available to it at designated times and/or locations.

FIG. 8 is a flow chart of an example process for spectrum management using TIC application according to some aspects of the present disclosure.

At step 800, the method can include receiving information related a schedule of use of a frequency band by one or more UEs of a system designated as incumbent user of the frequency band. Alternatively, the information received may be related to a schedule of use of the frequency band by one or more UEs of a system designated as a primary user of the frequency band. In another example, the information received may be related to a schedule of use of the frequency band by one or more UEs of a system designated as a secondary user of the frequency band, The UEs can include any component in the corresponding incumbent, primary, and/or secondary network capable of transmitting radio frequency signals that may cause interference with signals of another system operating in the same frequency band. For example, a UE can be a user terminal such as UEs 310, eNodeBs 306, radar 316, receivers/transmitters associated with airplanes 318, antennas of BAS users 206, 210, and/or 214 of FIG. 2, etc.

The frequency band can be the shared band described above with reference to FIGS. 2-7. The one or more UEs can be DoD users 108 of FIG. 2, aircrafts of airborne radar system 304 of FIGS. 3-7, etc.

The information received at step 800 can be the tuple information described above with reference to FIGS. 3-7, the information entered via IIC application 202 described for ENG users with reference to FIG. 2, etc.

In some examples, information at step 800 may not be received by instead can be queried by IIC applications in real-time and/or periodically (e.g., via ESC 326).

In some other examples, the information received may be obfuscated due to security concerns and limitations.

At step 802, the method can include coordinating use of the frequency band (e.g., shared frequency band described above) by one or more incumbent UEs of the shared band, primary UEs of the shared band, and one or more secondary UEs of the shared band. This coordination can be performed according to various examples described above with reference to FIGS. 2-7 above. For example, the information can be provided directly by IIC application via which the information is received at step 800 to a network controller (e.g., 5G core 308 or network optimizer 312), as described with reference to FIG. 7. Alternatively, the coordination may be performed by a network controller. The network controller can be the SMCS 102 of FIG. 2, federal SCS 322 of FIGS. 3-6, and/or commercial SAS 324 of FIGS. 3, 5, and 6.

In some examples, this coordination may include aggregating information received from any incumbent, primary, and/or secondary UE operating in the shared frequency band and generating a spectrum sharing schedule according to which the incumbent, primary, and any secondary UE may transmit signals in a manner that would eliminate or minimize interference with signal transmission by other UEs that may have priority for transmission in the shared band.

While in examples described above with reference to FIGS. 2-7, it is the incumbent system's UEs that provide notification of their usage of the shared band to the primary and/or secondary system in order to ensure no interference on the incumbent system by transmissions in the primary and/or secondary system, the present disclosure is not limited thereto. In some aspects, to maximize efficiency in utilization of resources available in the shared band, UEs and components of any system, whether incumbent, primary, or secondary, intending to use the shared band for transmission of RF signals, can provide that information (e.g., schedule of use) via a corresponding IIC application to the UEs and controllers of the other systems using the same shared band such that a comprehensive spectrum sharing schedule may be created for all devices operating in the shared band.

Optionally, the method of FIG. 8, when performed by a network controller (e.g., SMCS 102, federal SCS 302, commercial SAS 324, and/or any other network controller associated with IIC applications described above), can include a step 804 for dynamic spectrum sharing using a trained machine learning model. In some instances, a machine learning model or a neural network may be trained to received as input information associated with real-time usage of the shared band by various primary and secondary users, and provide as output a prediction of future use of the shared band. The network controller may then use this predict to perform resource allocation for primary and/or secondary users in the shared band (e.g., provide a map of allocated resource blocks in a manner similar to that shown in FIG. 4. An example neural network will be described below with reference to FIG. 11.

Various examples of application-based spectrum management have been described above with reference to FIGS. 2-8. In these examples, non-limiting scenarios are described with UEs of two different systems (e.g., a RAN system and a Radar system, two RAN systems such as BAS and DoD system). However, the present disclosure is not limited to sharing of a frequency band by UEs of two systems. In some examples, UEs of multiple independent systems (RANs, Radars, BASs, etc.) may cohabitate in and use resources of a particular frequency band and hence the application-based approach described above can be utilized by all systems sharing a band to provide a distributed and near real-time coordination of transmissions in the shared band to avoid interference.

Figure 9:
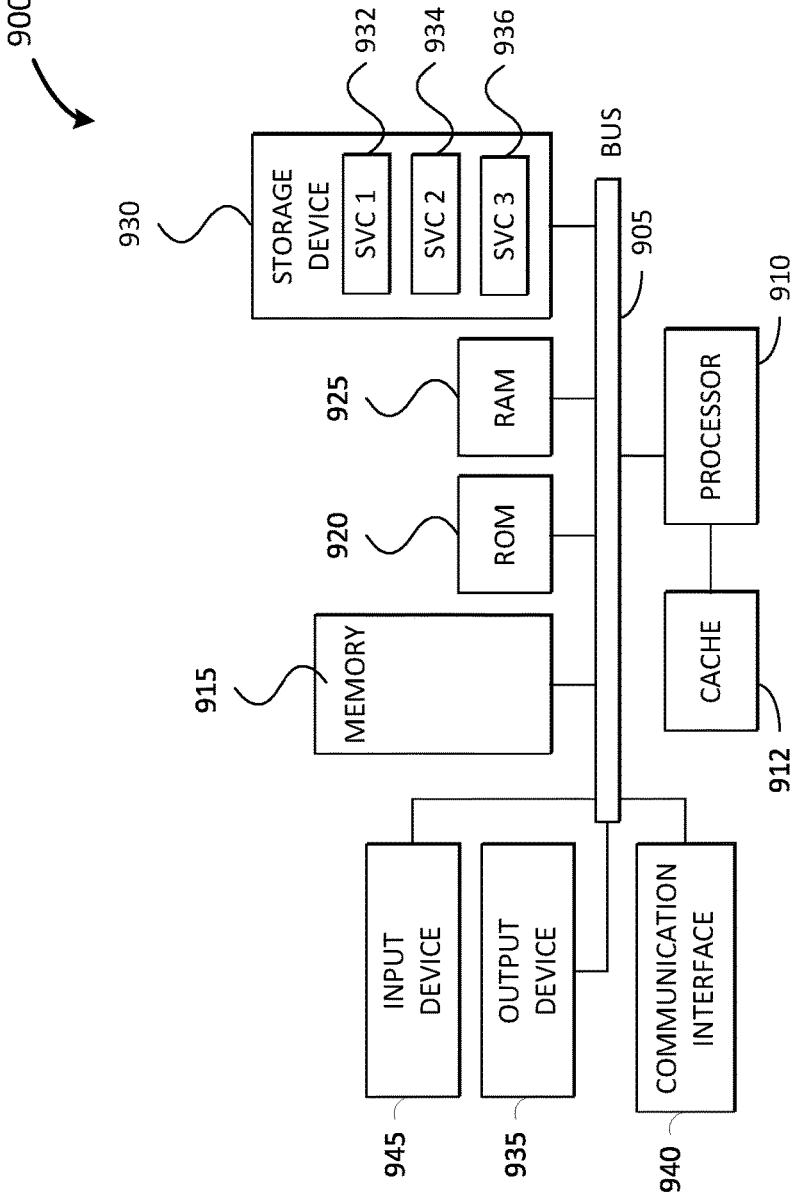
FIG. 9 illustrates an example network device according to some aspects of the present disclosure.

FIG. 9 illustrates an example network device according to some aspects of the present disclosure. Example of computing system 900 of FIG. 9 can be used to implement one or more component of the example systems and architectures described above with reference to FIGS. 2-8 including, but not limited to, any UE on which IIC application is installed, SCS 322, SAS 324, SMCS 102, etc. Connection 905 can be connection connecting various components of the computing system 900. For example, connection 905 can a physical connection via a bus, or a direct connection into processor 910, such as in a chipset architecture. Connection 905 can also be a virtual connection, networked connection, or logical connection.

In some embodiments computing system 900 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read only memory (ROM) 920 and random access memory (RAM) 925 to processor 910. Computing system 900 can include a cache of high-speed memory 912 connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 can essentially be a completely self-contained computing system, containing multiple cores or processors, a bus, memory controller, cache, etc. A multi-core processor can be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. There is no restriction on operating on any particular hardware arrangement and therefore the basic features here can easily be substituted for improved hardware or firmware arrangements as they are developed.

Storage device 930 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

For clarity of explanation, in some instances the present technology can be presented as including individual functional blocks including functional blocks comprising devices, device components, steps or routines in a method embodied in software, or combinations of hardware and software.

Any of the steps, operations, functions, or processes described herein can be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Figure 10:
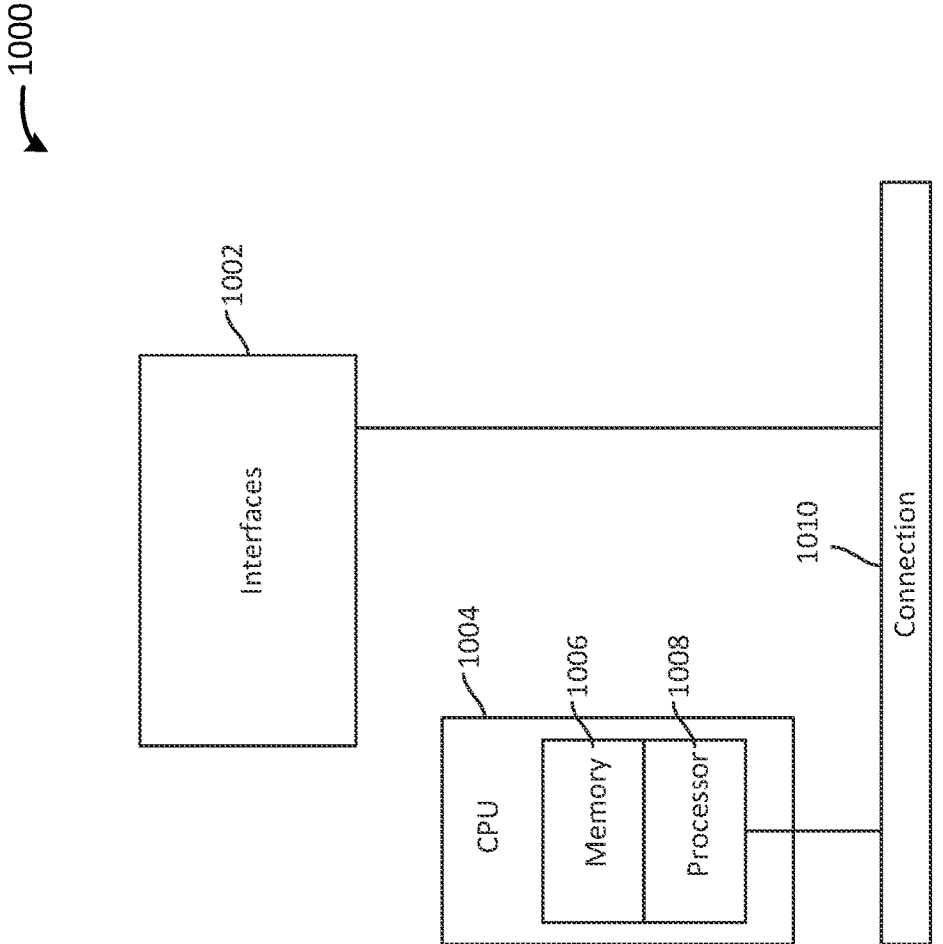
FIG. 10 shows an example of a computing system according to some aspects of the present disclosure.

FIG. 10 illustrates an example network device 1000 suitable for performing switching, routing, load balancing, and other networking operations. The example network device 1000 can be implemented as switches, routers, nodes, metadata servers, load balancers, client devices, and so forth.

Network device 1000 includes a central processing unit (CPU) 1004, interfaces 1002, and a bus 1010 (e.g., a PCI bus). When acting under the control of appropriate software or firmware, the CPU 1004 is responsible for executing packet management, error detection, and/or routing functions. The CPU 1004 preferably accomplishes all these functions under the control of software including an operating system and any appropriate applications software. CPU 1004 can include one or more processors 1008, such as a processor from the INTEL X86 family of microprocessors. In some cases, processor 1008 can be specially designed hardware for controlling the operations of network device 1000. In some cases, a memory 1006 (e.g., non-volatile RAM, ROM, etc.) also forms part of CPU 1004. However, there are many different ways in which memory could be coupled to the system.

The interfaces 1002 are typically provided as modular interface cards (sometimes referred to as "line cards"). Generally, they control the sending and receiving of data packets over the network and sometimes support other peripherals used with the network device 1000. Among the interfaces that can be provided are Ethernet interfaces, frame relay interfaces, cable interfaces, DSL interfaces, token ring interfaces, and the like. In addition, various very high-speed interfaces can be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces can include ports appropriate for communication with the appropriate media. In some cases, they can also include an independent processor and, in some instances, volatile RAM. The independent processors can control such communications intensive tasks as packet switching, media control, signal processing, crypto processing, and management. By providing separate processors for the communication intensive tasks, these interfaces allow the master CPU (e.g., 1004) to efficiently perform routing computations, network diagnostics, security functions, etc.

Although the system shown in FIG. 10 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 1000.

Regardless of the network device's configuration, it can employ one or more memories or memory modules (including memory 1006) configured to store program instructions for the general-purpose network operations and mechanisms for roaming, route optimization and routing functions described herein. The program instructions can control the operation of an operating system and/or one or more applications, for example. The memory or memories can also be configured to store tables such as mobility binding, registration, and association tables, etc. Memory 1006 could also hold various software containers and virtualized execution environments and data.

The network device 1000 can also include an application-specific integrated circuit (ASIC), which can be configured to perform routing and/or switching operations. The ASIC can communicate with other components in the network device 1000 via the bus 1010, to exchange data and signals and coordinate various types of operations by the network device 1000, such as routing, switching, and/or data storage operations, for example.

Figure 11:
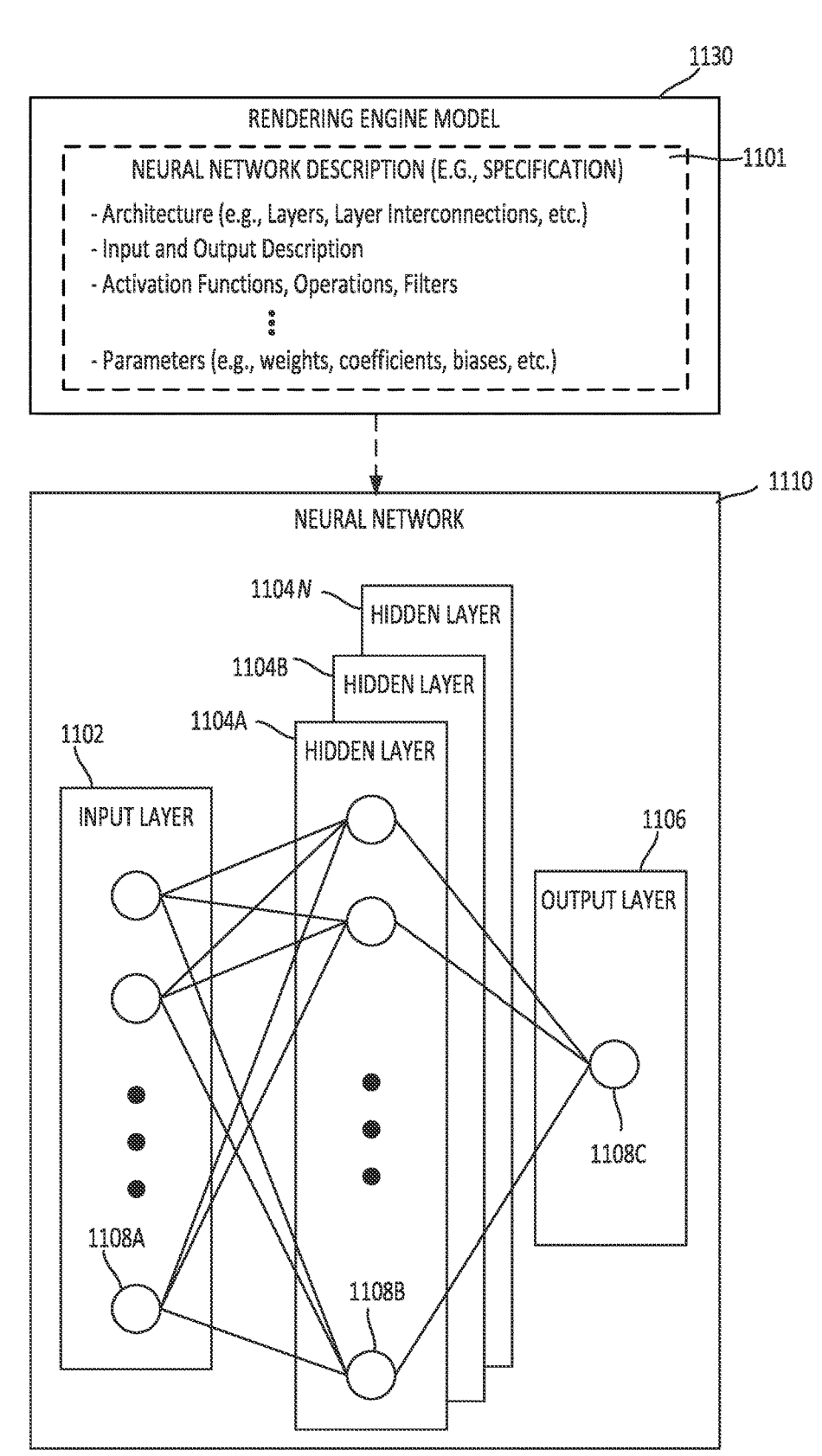
FIG. 11 illustrates an example neural network architecture according to some aspects of the present disclosure.

FIG. 11 illustrates an example neural network architecture according to some aspects of the present disclosure. Architecture 1100 includes a neural network 1110 defined by an example neural network description 1101 in rendering engine model (neural controller) 1130. Neural network 1110 can be used for the dynamic spectrum allocation described above with reference to step 804 of FIG. 8. Neural network description 1101 can include a full specification of neural network 1110. For example, neural network description 1101 can include a description or specification of the architecture of neural network 1110 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

In this example, neural network 1110 includes an input layer 1102, which can receive input data such as information of spectrum usage by UEs of various systems operating with the shared band, as described above with reference to FIGS. 2-8.

Neural network 1110 includes hidden layers 1104A through 1104N (collectively "1104" hereinafter). Hidden layers 1104 can include n number of hidden layers, where n is an integer greater than or equal to one. The number of hidden layers can include as many layers as needed for a desired processing outcome and/or rendering intent. Neural network 1110 further includes an output layer 1106 that provides as output, predicted future use/transmission of signals in a shared frequency band by one or more (or all) UEs of various systems utilizing and cohabitating in a shared frequency band. This output may be based on processing performed by hidden layers 1104.

Neural network 1110 in this example is a multi-layer neural network of interconnected nodes. Each node can represent a piece of information. Information associated with the nodes is shared among the different layers and each layer retains information as information is processed. In some cases, neural network 1110 can include a feed-forward neural network, in which case there are no feedback connections where outputs of the neural network are fed back into itself. In other cases, neural network 1110 can include a recurrent neural network, which can have loops that allow information to be carried across nodes while reading in input.

Information can be exchanged between nodes through node-to-node interconnections between the various layers. Nodes of input layer 1102 can activate a set of nodes in first hidden layer 1104A. For example, as shown, each of the input nodes of input layer 1102 is connected to each of the nodes of first hidden layer 1104A. The nodes of hidden layer 1104A can transform the information of each input node by applying activation functions to the information. The information derived from the transformation can then be passed to and can activate the nodes of the next hidden layer (e.g., 1104B), which can perform their own designated functions. Example functions include convolutional, up-sampling, data transformation, pooling, and/or any other suitable functions. The output of the hidden layer (e.g., 1104B) can then activate nodes of the next hidden layer (e.g., 1104N), and so on. The output of the last hidden layer can activate one or more nodes of output layer 1106, at which point an output is provided. In some cases, while nodes (e.g., nodes 1108A, 1108B, 1108C) in neural network 1110 are shown as having multiple output lines, a node has a single output and all lines shown as being output from a node represent the same output value.

In some cases, each node or interconnection between nodes can have a weight that is a set of parameters derived from training neural network 1110. For example, an interconnection between nodes can represent a piece of information learned about the interconnected nodes. The interconnection can have a numeric weight that can be tuned (e.g., based on a training dataset), allowing neural network 1110 to be adaptive to inputs and able to learn as more data is processed.

Neural network 1110 can be pre-trained to process the features from the data in the input layer 1102 using the different hidden layers 1104 in order to provide the output through output layer 1106. In an example in which neural network 1110 is used to predict usage of the shared band, neural network 1110 can be trained using training data that includes past transmissions and operation in the shared band by the same UEs or UEs of similar systems (e.g., Radar systems, RAN systems, etc.). For instance, past transmission information can be input into neural network 1110, which can be processed by neural network 1110 to generate outputs which can be used to tune one or more aspects of neural network 1110, such as weights, biases, etc.

In some cases, neural network 1110 can adjust weights of nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training media data until the weights of the layers are accurately tuned.

For a first training iteration for neural network 1110, the output can include values that do not give preference to any particular class due to the weights being randomly selected at initialization. For example, if the output is a vector with probabilities that the object includes different product(s) and/or different users, the probability value for each of the different product and/or user may be equal or at least very similar (e.g., for ten possible products or users, each class may have a probability value of 0.1). With the initial weights, neural network 1110 is unable to determine low level features and thus cannot make an accurate determination of what the classification of the object might be. A loss function can be used to analyze errors in the output. Any suitable loss function definition can be used.

The loss (or error) can be high for the first training dataset (e.g., images) since the actual values will be different than the predicted output. The goal of training is to minimize the amount of loss so that the predicted output comports with a target or ideal output. Neural network 1110 can perform a backward pass by determining which inputs (weights) contributed most to the loss of neural network 1110, and can adjust the weights so that the loss decreases and is eventually minimized.

A derivative of the loss with respect to the weights can be computed to determine the weights that contributed most to the loss of neural network 1110. After the derivative is computed, a weight update can be performed by updating the weights of the filters. For example, the weights can be updated so that they change in the opposite direction of the gradient. A learning rate can be set to any suitable value, with a high learning rate including larger weight updates and a lower value indicating smaller weight updates.

Neural network 1110 can include any suitable neural or deep learning network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, neural network 1110 can represent any other neural or deep learning network, such as an autoencoder, a deep belief nets (DBNs), a recurrent neural networks (RNNs), etc.

For clarity of explanation, in some instances the present technology can be presented as including individual functional blocks including functional blocks comprising devices, device components, steps or routines in a method embodied in software, or combinations of hardware and software.

Any of the steps, operations, functions, or processes described herein can be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A spectrum management system comprising:
one or more incumbent user equipment configured to operate in a frequency band;
one or more primary user equipment configured to operate in the frequency band;
a software application installed and executed on each of the one or more incumbent user equipment and the one or more primary user equipment, wherein the software application is configured to:
    determine information related to a schedule of use of the frequency band by the one or more incumbent user equipment;
    coordinate use of the frequency band by the one or more incumbent user equipment and the one or more primary user equipment to ensure transmissions by the one or more incumbent user equipment and the one or more primary user equipment do not interfere, wherein the software application has a graphical user interface configured to receive at least a portion of the information as input on each of the one or more incumbent user equipment and the one or more primary user equipment.

2. The spectrum management system of claim 1, wherein the software application is configured to determine the information by receiving a number of parameters via the graphical user interface of the software application.

3. The spectrum management system of claim 2, wherein the number of parameters include one or more of a location of a corresponding one of the one or more incumbent user equipment, a time of transmission by the corresponding one of the one or more incumbent user equipment, and a frequency at which the transmission occurs.

4. The spectrum management system of claim 3, wherein the software application is configured to coordinate the use of the frequency band by:
    transmitting the information to a network controller of a system with which the one or more primary user equipment are associated, the network controller managing the transmissions by the one or more primary user equipment to not occur at the location, the time and the frequency identified in the information.

5. The spectrum management system of claim 1, wherein the software application on any of the one or more incumbent user equipment is directly connected with the software application on any one of the one or more primary user equipment, the one or more primary user equipment being one or more base stations of a radio access network.

6. The spectrum management system of claim 4, wherein the software application is indirectly connected to the network controller via one or more intermediary components.

7. The spectrum management system of claim 6, wherein the one or more intermediary components include at least one of a federally operated spectrum coordination system or a commercial spectrum access system.

8. The spectrum management system of claim 1, wherein the one or more incumbent user equipment operate in a radar system and the one or more primary user equipment operate in a radio access network.

9. The spectrum management system of claim 1, wherein the one or more incumbent user equipment operate in a first radio access network and the one or more primary user equipment operate in a second radio access network.

10. The spectrum management system of claim 1, further comprising: one or more processors configured to monitor and detect operations of the one or more incumbent user equipment, wherein information obtained from monitoring and detecting the operation of the one or more incumbent user equipment may be provided to a spectrum access system, the spectrum access system being configured to use the information provided by the one or more processors and the software application to coordinate transmissions by the one or more primary user equipment.

11. The spectrum management system of claim 1, further comprising:
a network controller communicatively coupled to the software application installed on the one or more incumbent user equipment and the one or more primary user equipment, the network controller being configured to perform automated dynamic spectrum sharing.

12. The spectrum management system of claim 11, wherein the network controller is configured to perform automated dynamic spectrum sharing using a trained machine learning model.

13. The spectrum management system of claim 12, wherein the machine learning model is configured to receive as input, near real-time transmission information for the one or more incumbent user equipment and the one or more primary user equipment, and provide as output, predicted future transmissions on the frequency band, wherein the network controller is configured to perform dynamic assignment of resource blocks in the frequency band to the one or more incumbent user equipment and primary user equipment, based on the predicted future transmissions.

14. The spectrum management system of claim 1, wherein the software application is configured to determine the information in real-time.

15. The spectrum management system of claim 1, further comprising:
at least one secondary user equipment configured to operate in the frequency band with the one or more incumbent user equipment and the one or more primary user equipment, the at least one secondary user equipment being associated with a system independent of systems with which the one or more incumbent user equipment and the one or more primary user equipment are associated, wherein the software application is installed on the at least one secondary user equipment to enable the coordination among the one or more incumbent user equipment, the one or more primary user equipment, and the at least one secondary user equipment.

16. One or more non-transitory computer-readable media comprising computer-readable instructions, which when executed by one or more processors of a first user equipment, cause the first user equipment to:

receive, via graphical user interface, a number of inputs related to a schedule of signal transmission by the user equipment over a frequency band that is shared by at least the first user equipment and a plurality of second user equipment, each of the plurality of second user equipment being one of an incumbent user equipment operating in the frequency band or a primary user equipment operating in the frequency band;

determine information related to a schedule of use of the frequency band by at least the first user equipment and one or more of the plurality of a second user equipment; and enable coordination of use of the frequency band by the first user equipment and the one or more of the plurality of second user equipment to ensure that signal transmissions by the first user equipment in the frequency band do not interference with signal transmissions by the second user equipment in the frequency band, wherein.

17. The one or more non-transitory computer-readable media of claim 16, wherein the execution of the computer-readable instructions cause the first user equipment to receive the number of inputs in real-time and enable the coordination in near real-time.

18. The one or more non-transitory computer-readable media of claim 16, wherein the first user equipment operates in a first system having incumbent privileges for operating in the frequency band while the second user equipment operates in a second system having primary privileges for operating in the frequency band.

19. The one or more non-transitory computer-readable media of claim 16, wherein the first user equipment operates in a first system having primary privileges for operating in the frequency band while the second user equipment operates in a second system having secondary privileges for operating in the frequency band.

20. The one or more non-transitory computer-readable media of claim 16, wherein the number of inputs include one or more of a location of the first user equipment, a time of transmission by the first user equipment, and a frequency at which the transmission occurs.

\* \* \* \* \*